A. DE CONINCK.
BRAKING SYSTEM.
APPLICATION FILED JUNE 10, 1920.
1,412,104.                                   Patented Apr. 11, 1922.
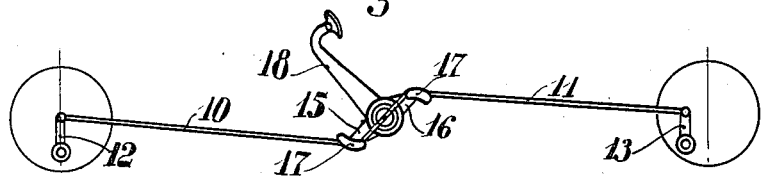
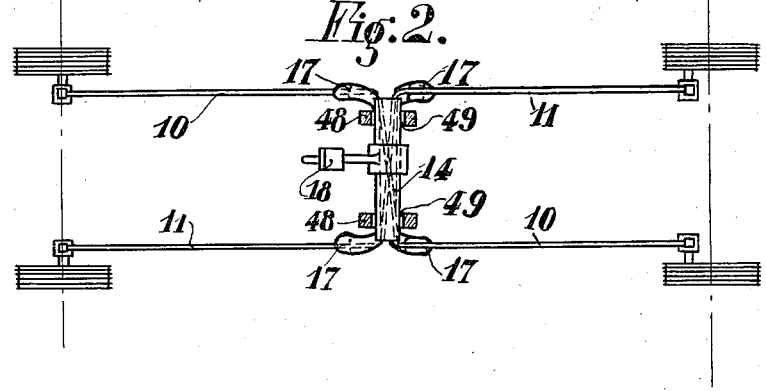
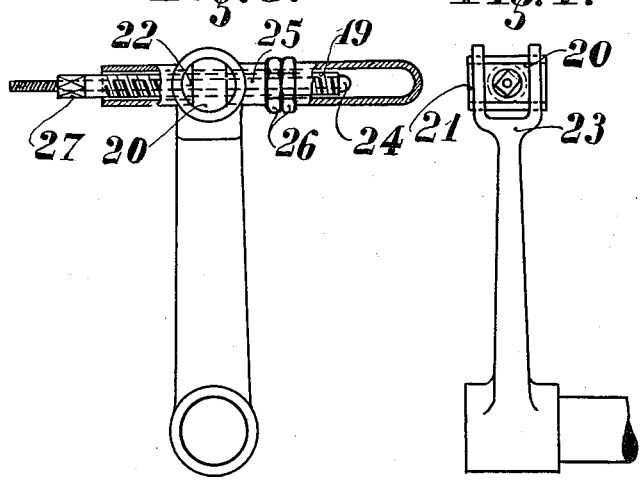
Inventor—
Arthur De Coninck,
By— P. Singer.
Atty.

UNITED STATES PATENT OFFICE.

ARTHUR DE CONINCK, OF BRUSSELS, BELGIUM.

BRAKING SYSTEM.

1,412,104.  Specification of Letters Patent.  Patented Apr. 11, 1922.

Application filed June 10, 1920. Serial No. 388,055.

(GRANTED UNDER THE PROVISIONS OF THE ACT OF MARCH 3, 1921, 41 STAT. L., 1313.)

*To all whom it may concern:*

Be it known that I, ARTHUR DE CONINCK, a subject of the King of Belgium, residing at 43ª Rue des Aduatiques, Brussels, Belgium, have invented new and useful Improvements in or Relating to Braking Systems, (for which I have filed applications in Germany, October 21, 1918, Patent No. 334,175; Belgium, December 2, 1918, Patent No. 273,977; France, January 28, 1919, Patent No. 495,244, and Great Britain, February 13, 1919, Patent No. 136,132.)

The many advantages of simultaneously braking the driving and steering wheels of an automobile vehicle are known.

The devices hitherto suggested with this end in view are generally complicated, costly, awkward to adjust and difficult to apply. Moreover the braking effort is usually balanced by means of a special whippletree or similar mechanism for both the wheels of each axle.

The present invention consists in pro- providing an arrangement enabling diagonal balanced braking to be obtained by means of flexible brake gear, the adjustment of which is easy and instantaneous.

One constructional form of this device is shown diagrammatically in the accompanying drawing merely by way of illustration.

Figure 1 is an elevation, and

Figure 2 a plan showing the arrangement of the brake rigging and the way in which it is actuated and compensates or balances the brakes by means of a single controlling member.

Figures 3 and 4 show respectively a side view and an end view of the adjustable device for attaching the cable of the brake gear to the lever that actuates the brake blocks or segments.

The two flexible diagonal brake gears consist of two metallic cables 10 and 11 the extremities of which are respectively attached to one of the levers 12 of the brake of one of the front wheels and to the lever 13 of the brake of the back wheel situated on the opposite side.

Each cable 10 and 11 passes inside a hollow shaft 14, which is mounted transversely to the underframe in bearings 49 and is provided at its extremities with two diametral arms 15 and 16, each terminating in a guiding spoon 17 or similar device for the purpose of deflecting the cables parallel to the axle of the vehicle.

The shaft 14 is actuated by the pedal 18 and acts like a single compensating swingletree for the purpose of actuating the double diagonal brake rigging which brakes the four wheels of the vehicle simultaneously.

It will be seen from Figures 1 and 2 that the effort exerted on each cable by the arms 15 and 16 of the swingle-tree shaft 14 is balanced by the sliding of this cable inside the said shaft and on the guiding spoons 17 of these arms.

The extremities of each cable are attached to the corresponding brake levers by means of the device shown in Figures 3 and 4.

The extremity of a cable is threaded through a tube 19 that screws into a nut 20 which is supported by lateral trunnions 21 in the apertures 22 of a fork 23 terminating each of the brake levers 12 or 13.

The cable terminates in a soldered knot 24 in the form of a sphere which bears in a corresponding groove in the extremity of the tube 19.

A thick washer 25 is inserted between the pivoting nut 20 and two lock nuts 26.

The adjustment of the brake rigging may in this way be effected at each extremity of the cable by suitably screwing the tube 19 into the nut 20 and then tightening the lock nuts 26.

The screwing of the tube 19 is effected by means of a spanner or key acting on the square part 27 of the tube.

Owing to the knot extremity 24 of the cable being spherical the tube 19 can be screwed up or unscrewed without causing torsion of the cable.

Having now particularly described and ascertained the nature of my said invention and in what manner the same is to be performed, I declare that what I claim is:—

1. An adjustable balanced braking system acting diagonally on the four wheels of a vehicle, comprising four brake levers, two flexible connectors uniting said levers in pairs diagonally, a common hollow shaft mounted transversely to the underframe and through which said connectors slide, bearings for said shaft, a lever for said shaft to enable the same to be turned, and diametrically opposite deflecting arms provided on the said shaft and engaging said connectors.

2. Brake apparatus comprising four brake levers for the respective wheels, flexible connectors uniting said brake levers diagonally in pairs, a transversely arranged hollow shaft mounted in bearings and through which said connectors slide, deflecting arms on said shaft, engaging said connectors, and means for turning said shaft.

In testimony whereof I affix my signature in presence of two witnesses.

ARTHUR DE CONINCK.

Witnesses:
L. PARETTE,
GEO. BALRAUS.